United States Patent Office 3,600,395
Patented Aug. 17, 1971

3,600,395
1-PHENYLETHYL-4-AMINOMETHYL-4-
PIPERIDINOL COMPOUNDS
Gilbert Regnier, Chatelay-Malabry, Roger Canevari, Clamart, and Jacques Duhault, Chatou, France, assignors to Société en nom collectif: Science Union et Cie, Societe Francaise de Recherche Medicale, Suresnes, France
No Drawing. Filed May 2, 1969, Ser. No. 821,504
Claims priority, application Great Britain, May 21, 1968, 24,176/68
Int. Cl. C07d 29/34
U.S. Cl. 260—293.4
7 Claims

ABSTRACT OF THE DISCLOSURE

1 - phenylethyl, or 1-fluorophenylethyl-4-aminomethyl piperidin-4-ols, substituted on the amino by: aliphatic acyl having up to five carbon atmos inclusive, benzoyl, hydroxybenzoyl, chlorobenzoyl, acetoxybenzoyl, methylenedioxybenzoyl, parachlorophenoxyacetyl, nicotinoyl, diethylcarbamoyl or methylsulfonyl.

These compounds possess bronchodilatory, antitussive, analgesic, and antiinflamatory properties and antagonize serotonin, histamine and acetyl-choline.

The present invention provides piperidinol compounds of the general formula

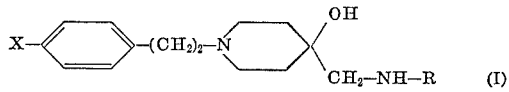

wherein:

X is a substituent selected from the group consisting of a hydrogen and a fluorine atom, and
R is a substituent selected from the group consisting of
  (a) an aliphatic acyl radical having up to five carbon atoms inclusive, in a linear or branched chain, preferably an acetyl, propionyl or trimethyl acetyl radical,
  (b) a benzoyl, hydroxybenzoyl, chlorobenzoyl, acetoxybenzoyl, methylenedioxybenzoyl radical,
  (c) a parachlorophenoxyacetyl radical,
  (d) a nicotinoyl radical,
  (e) a diethylcarbamoyl radical, and
  (f) a methylsulfonyl radical.

The compounds of the present invention may be prepared by condensing an acid chloride of the general formula

R—Cl (II)

in which R has the meaning defined above, with an aminoalcohol of the general formula

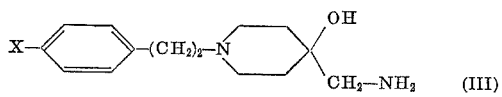

in which X has the meaning defined above.

The most advantageous manner of carrying out the process of the present invention comprises reacting substantially equimolecular proportions of an acid chloride of the general Formula II and an appropriate aminoalcohol of the general Formula III in a weakly polar solvent, for example an ether oxide, for example sulfuric ether, an aliphatic ketone, for example, acetone, or a tertiary aliphatic amide, for example, dimethylformamide. The reaction temperature required for such a condensation is preferably within the range from 0 to 60° C. The condensation product of the Formula I settles out from the reaction medium as an addition salt with the hydrochloric acid formed during the reaction. If desired, the salt thus obtained may be purified by crystallization from an appropriate solvent or it may be converted into the corresponding base by treatment with an alkali.

Thus the present invention also provides salts of the compounds of the Formula I, especially physiologically tolerable salts. The bases obtained by the present process may themselves be purified by physical methods, for example, crystallization, distillation or chromatography, or by chemical methods, for example, formation of acid addition salts with mineral or organic acids in a suitable solvent, for example, water or a water-miscible alcohol. From among mineral acids used for the formation of such salts there may be mentioned hydrochloric, hydrobromic, isothionic, sulfuric, phosphoric and sulfamic acid, and from among the organic acids acetic, propionic, methanesulfonic, maleic, fumaric, tartaric, citric, oxalic and benzoic acid.

The piperidinol compounds and their addition salts, obtained by the present process, are valuable pharmaceuticals; they have especially noteworthy bronchodilatory, antitussive, analgesic, and antiinflammatory activities and antagonize serotonin, histamine and acetylcholine.

The toxicity studied in mice showed that their $LD_{50}$ varies from 75 to 600 mg./kg. by the intraperitoneal route.

The new compounds inhibit bronchospasm in the guinea-pig, provoked by an intravenous injection of histamine, serotonin or acetylcholine, according to the method of Konzett H. and Roosler R. [Arch. Exptl. Path. U. Pharmak. 195, 71 (1940)]. Doses of 0.5 to 5 mg./kg. inhibit the spasm from 50 to 100%.

When administered intraperitoneally at 10 to 40 mg./kg., they protect the guinea-pig against bronchospasm induced by the inhalation of 4% of histamine aerosol to the extent of 11 to 72% [cf. A.K. Armitage, Brit. J. Pharmacol. 17, 196 (1961)].

It was also observed that the new derivatives, when administered at 20 to 40 mg./kg. subcutaneously, decrease from 33 to 71% the cough of the guinea-pig, submitted to a 40% citric acid aerosol for 4 minutes [Gosswald R. Arzfschg 8, 550 (1958)].

The analgesic activity was studied in mice by the hot plate method of E. Adami and E. Marazzi [(Arch. Internat. Pharmacodyn. 107, 322 (1956)]. It was observed that the new derivatives increase the threshold of pain-perception from 26 to 157% with doses of 10 to 100 mg./kg. by the intraperitoneal route.

An antiinflammatory activity was demonstrated on the plantar oedema of the rat's paw induced by injection of carrageenin [Winter, C. H. et al., Proc. Soc. Exp. Biol. Med. 3, 544 (1962)]. It was noted that the compounds of the invention inhibit this oedema up to 30% when administered p.o. at 20 to 40 mg./kg.

The above described pharmacological properties and the low toxicity enable the use of the new piperidinols in therapy, and especially in the treatment of respiratory insufficiency, spasm and pain.

The active principle may be administered alone or in admixture or conjunction with usual pharmaceutical carriers such, for example, as distilled water, starch, talc, glucose, lactose or cocoa butter. The pharmaceutical forms may be: tablets, dragées, capsules, suppositories or solutions, for oral, rectal or parenteral administration. The doses may vary from 10 to 200 mg., 2 to 4 times per day.

The following examples illustrate this invention. Unless otherwise indicated, the melting points were determined with the aid of a capillary tube.

EXAMPLE 1

1-phenylethyl-4-propionamidomethyl-piperidin-4-ol hydrochloride

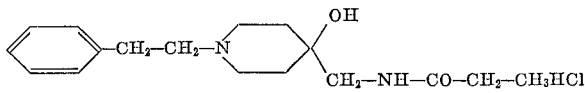

During 10 minutes 2 grams (0.0213 mol) of propionylchloride were dropped into a solution of 5 g. (0.0213 mol) of 1-phenylethyl-4-aminomethyl-piperidin-4-ol in 50 ml. of dimethylformamide. The internal temperature rose gradually to 60° C. and a white precipitate appeared. On completion of the addition of propionylchloride the suspension was heated for 1 hour at 55 to 60° C., then cooled and the hydrochloride formed (5.3 g.) was filtered off, recrystallized from 50 ml. of boiling ethanol, and finally yielded 4.3 g. of 1-phenylethyl-4-propionamidomethyl-piperidin-4-ol hydrochloride, melting at 248–250° C.

The starting 1-phenylethyl-4-aminomethyl-piperidin-4-ol, is described in our U.S. Pat. 3,399,192.

EXAMPLES 2–12

The following derivatives were prepared in an identical manner:

(2) 1-phenylethyl - 4 - methylsulfonylaminomethyl-piperidine-4-ol hydrochloride, melting at 258–259° C. from methanol, obtained from 1-phenylethyl-4-aminomethyl-piperidin-4-ol and methylsulfonylchloride.

(3) 1 - phenylethyl - 4 - parachlorophenoxyacetamidomethyl-piperidin-4-ol hydrochloride, melting at 247–248° C. from 99% ethanol, obtained from 1-phenylethyl-4-aminomethyl-piperidin-4-ol and parachlorophenoxy acetylchloride.

(4) 1-phenylethyl - 4 - nicotinoylaminomethyl - piperidin-4-ol, melting at 114° C. (Kofler heater) from isopropanol, obtained from 1-phenylethyl-4-aminomethyl-piperidin-4-ol and nicotinoylchloride.

(5) 1-phenylethyl - 4 - acetamidomethyl-piperidin-4-ol hydrochloride, melting at 250–251° C. from isopropanol, obtained from 1-phenylethyl-4-aminomethyl-piperidin-4-ol and acetylchloride.

(6) 1-parafluorophenylethyl - 4 - propionamidomethyl-piperidin-4-ol hydrochloride, melting at 258–259° C. from ethanol, obtained from 1-parafluorophenylethyl-4-aminomethyl-piperidin-4-ol and propionylchloride.

The starting 1-parafluorophenylethyl-4-aminomethyl-piperidin-4-ol, M.P. (capillary) 77–79° C., was prepared by hydrolysing with sodium hydroxide the 1-oxa-2-oxo-3,8-diaza-8-parafluorophenylethyl spiro (4,5) decane, which is itself described in our U.S. Pat. No. 3,399,192.

(7) 1 - phenylethyl - 4 - trimethylacetamidomethyl - piperidin-4-ol hydrochloride, melting at 246–247° C. from anhydrous ethanol, obtained from 1-phenylethyl-4-aminomethyl-piperidin-4-ol and trimethylacetylchloride.

(8) 1-phenylethyl - 4 - (3,4-methylenedioxy-benzamidomethyl)-piperidin-4-ol-hydrochloride, melting at 277–278° C. from anhydrous methanol, obtained from 1-phenylethyl-4-aminomethyl-piperidin-4-ol and 3,4-methylenedioxy-benzoylchloride.

(9) 1-parafluorophenylethyl - 4 - (3,4-methylenedioxy-benzamidomethyl)-piperidin-4-ol hydrochloride, melting at 273° C. from anhydrous ethanol, obtained from 1-parafluorophenylethyl-4-aminomethyl-piperidin-4-ol and 3,4-methylenedioxy-benzoylchloride.

(10) 1-phenylethyl - 4 - diethylcarbamoylaminomethyl-piperidin-4-ol hydrochloride, melting at 169–171° C. from acetonitrile, obtained from 1-phenylethyl-4-aminomethyl-piperidin-4-ol and diethylcarbamoylchloride.

(11) 1-phenylethyl - 4 - benzamidomethyl-piperidin-4-ol, obtained from 1-phenylethyl-4-aminomethyl-piperidin-4-ol and benzoylchloride.

(12) 1-phenylethyl - 4 - (2-chlorobenzamidomethyl)-piperidin-4-ol, obtained from 1-phenylethyl-4-aminomethyl-piperidin-4-ol and 2-chlorobenzoylchloride.

Compounds having the chloro in other positions are obtained in the same manner from the respective suitably selected starting materials, e.g., the 3-position and the 4-position.

EXAMPLE 13

1-phenylethyl-4-(2-acetoxy-benzamidomethyl)-piperidin-4-ol hydrochloride

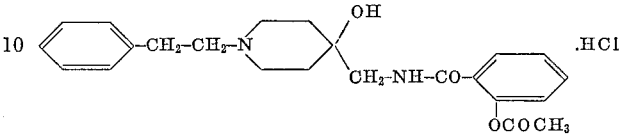

15 grams (0.0768 mol) of 2-acetoxybenzoylchloride are dropped at 0° C. within 10 minutes into a solution of 18 g. (0.0768 mol) of 1-phenylethyl-4-aminomethyl-piperidin-4-ol in ½ litre of anhydrous ether, whereupon an abundant white precipitate forms. The batch is allowed to react with agitation for 5 hours at 0 to +5° C. and the precipitate (28 g.) is suctioned off and recrystallized from 700 ml. of anhydrous isopropanol, to yield 10 g. of 1-phenylethyl-4-(2 - acetoxybenzamidomethyl)-piperidin-4-ol hydrochloride, melting at 179–180° C.

EXAMPLE 14

1-phenylethyl-4-salicylamidomethyl-piperidin-4-ol hydrochloride

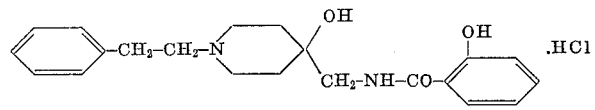

15 grams (0.0768 mol-2-acetoxybenzoylchloride are dropped within 15 minutes at 0° C. into a solution of 18 g. of 1-phenylethyl-4-aminomethyl - piperidin-4-ol (0.0768 mol) in ½ litre of anhydrous ether, whereupon an abundant white precipitate forms. The batch is agitated for 5 hours at 20° C. and the precipitate (26 g.) is suctioned off and treated for 3 hours with 150 ml. of N-sodium hydroxide solution at 50° C. The resulting solution is filtered and neutralized to a pH value of 7 with 150 ml. of N-hydrochloric acid, whereupon 11 grams of the crude base precipitate; it melts at 176–177° C. from ethanol.

When dry HCl is added to a methanolic solution of this base, there are finally obtained 8.2 g. or 1-phenylethyl-4-salicylamidomethyl-piperidin-4-ol hydrochloride melting at 239–240° C.

Various modifications may be made in the compounds, compositions, methods, and procedures of the present invention without departing from the spirit or scope thereof, as obvious modifications and equivalents will be apparent to one skilled in the art.

What we claim is:

1. A compound selected from the group consisting of (A) piperidinols of the Formula I

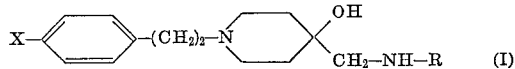

wherein
X s selected from the group consisting of hydrogen and fluorine, and
R is selected from the group consisting of
 (a) aliphatic acyl radical which is a member of the group consisting of acetyl, propionyl, and trimethyl acetyl,
 (b) benzoyl, hydroxybenzoyl, chlorobenzoyl, acetoxybenzoyl and methylenedioxybenzoyl,
 (c) parachlorophenoxyacetyl,
 (d) nicotinoyl,
 (e) diethylcarbamoyl, and
 (f) methylsulfonyl, and
(B) physiologically acceptable addition salts thereof with organic and mineral acids.

2. A compound of claim 1 which is 1-phenylaethyl-4-propionamidomethyl-piperidin-4-ol hydrochloride.

3. A compound of claim 1 which is 1-phenylethyl-4-methylsulfonylaminomethyl-piperidin-4-ol.

4. A compound of claim 1 which is 1-phenylethyl-4-nicotinoylaminomethyl-piperidin-4-ol.

5. A compound of claim 1 which is 1-phenylethyl-4-(3,4-methylenedioxybenzamidomethyl)-piperidin-4-ol hydrochloride.

6. A compound of claim 1 which is 1-parafluorophenylethyl-4-(3,4-methylenedioxybenzamidomethyl)-piperidin-4-ol hydrochloride.

7. A compound of claim 1 which is 1-phenylethyl-4-salicylamidomethyl-piperidin-4-ol hydrochloride.

References Cited
UNITED STATES PATENTS

| | | | |
|---|---|---|---|
| 2,075,359 | 3/1937 | Salzberg et al. | 424—250 |
| 2,538,107 | 1/1951 | Kwartler et al. | 260—294A |
| 3,278,541 | 10/1966 | Schmitt et al. | 260—294A |

HENRY R. JILES, Primary Examiner

S. D. WINTERS, Assistant Examiner

U.S. Cl. X.R.

260—294, 294.3, 294.7; 424—267